Figure 1:
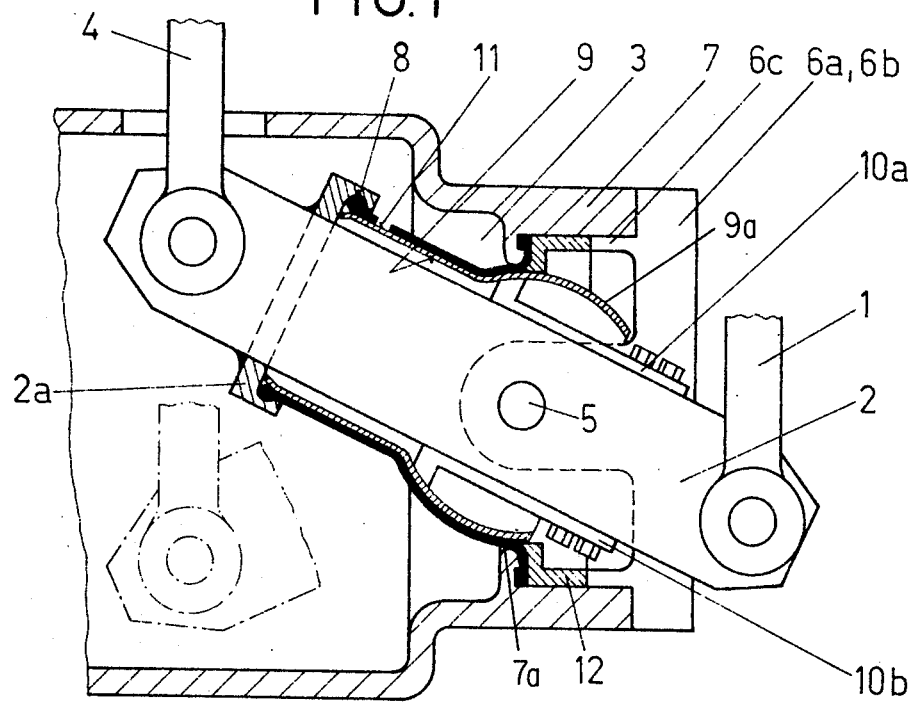

ously Patent [19]

Strübin

[11] 4,020,307
[45] Apr. 26, 1977

[54] COMPRESSED GAS ELECTRICAL SWITCH WITH GAS-TIGHT HOUSING
[75] Inventor: Harald Strübin, Fislisbach, Switzerland
[73] Assignee: BBC Brown Boveri & Company Limited, Baden, Switzerland
[22] Filed: June 5, 1975
[21] Appl. No.: 584,043
[30] Foreign Application Priority Data
June 17, 1974 Switzerland .............. 8246/74
[52] U.S. Cl. .................. 200/302; 277/212 FB; 74/18.1; 200/148 B
[51] Int. Cl.² ............................ H01H 9/04
[58] Field of Search ........... 200/302, 153 R, 148 B; 74/18.1, 519, 520, 559; 277/212 FB; 251/335 R, 335 A, 335 B

[56] References Cited
UNITED STATES PATENTS

| 2,718,575 | 9/1955 | Taylor | 200/302 |
| 2,726,105 | 12/1955 | Koenig | 200/302 |
| 3,164,389 | 1/1965 | Thomas | 277/212 FB |
| 3,290,073 | 12/1966 | Gottschald | 277/212 FB |

Primary Examiner—Gerald P. Tolin
Attorney, Agent, or Firm—Pierce, Scheffler & Parker

[57] ABSTRACT

A compressed gas electrical switch wherein the switching point, i.e. the contact actuating mechanism is operated by means including a pivotally mounted lever which is introduced into the pressure-gas filled switch housing. For sealing the lever at the point of entry into the switch housing, the lever is surrounded partially by a sleeve connected to it and which is provided at the entry point with a spherically shaped zone. A highly elastic sealing gasket rests upon the outer surface of the sleeve, one end of the gasket including a connected flange at one end situated on the spherically shaped zone of the sleeve, and the other end of the gasket being secured to the end of the sleeve within a disc-shaped part connected in a gas-tight manner to the lever.

2 Claims, 2 Drawing Figures

COMPRESSED GAS ELECTRICAL SWITCH WITH GAS-TIGHT HOUSING

The present invention relates in general to a compressed gas electrical switch with a gas-tight housing and more particularly to an improved arrangement for introducing into the housing in a gas-tight manner, a pivotally mounted operating lever for actuating the switching point mechanism located within the housing for opening and closing a circuit through the switch.

A switch of this general type is disclosed in published German Pat. No. 1,107,763 and wherein the sealing component is constituted by a folded bellows which is connected at one end to the switch housing and at the other end to the pivotally mounted lever. The folded bellows is subjected to internal pressure by the pressure of the gas within the switch housing and is also subjected to accordian-type stresses as the pivotally mounted lever is acutated, i.e. under lifting and bending stresses. However, such combined stresses tend to shorten the service life of the bellows, and there arises the additional problem of mechanical stresses to which the relatively long actuating lever is subjected due to the relatively limited angle of traverse, and especially in the case where strong motive forces are involved.

The general object of the present invention is to provide an improved structural arrangement for attaining a gas pressure-tight introduction of the switch point actuating lever into the gas-filled switch housing and wherein the stress situation of the sealing component is greatly improved, namely, in that the sealing part proper need not be a pressure-proof structure. This objective is attained in that the pivotally mounted lever is sealed at the housing by means of an elastic gasket, and that the lever is surrounded partially by a sleeve connected to it and provided, at the point of entry into the housing, the sleeve including a spherically-shaped zone where the gasket rests upon its outer surface. Due to this arrangement the sleeve will absorb the pressure load, thereby reducing costs in an advantageous manner and making possible a variety of uses for the novel arrangement in connection with the pressures, forces and travels, always to be considered in the case of various switch designs.

Figure 2:
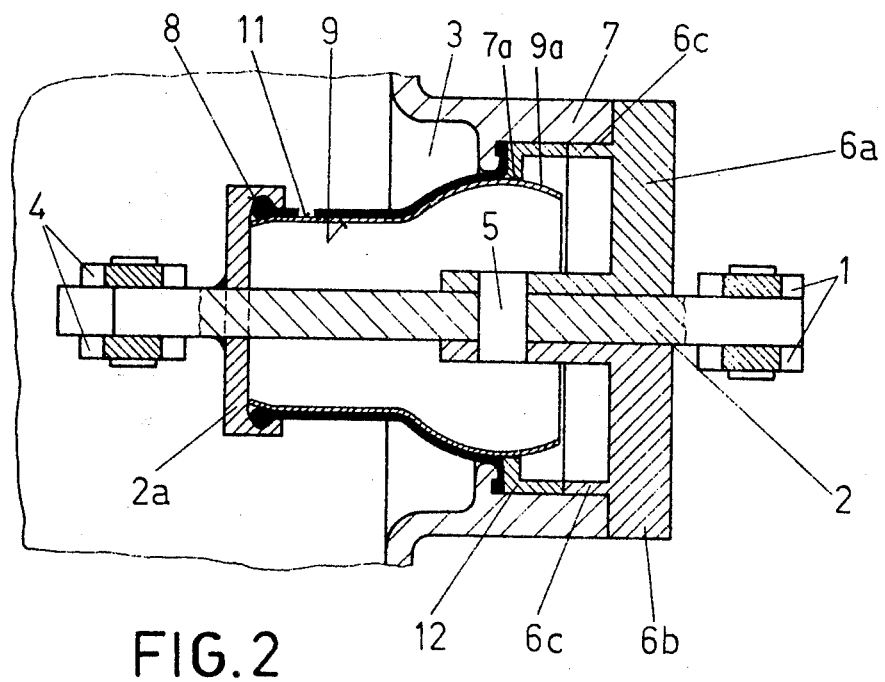

A preferred embodiment of the invention is illustrated in the accompanying drawings wherein:

FIG. 1 is a vertical section through a portion of the switch housing where the actuating lever is entered in a gas-tight manner, the lever being shown in one limit position in full lines and indicated in the opposite limit position by the dot-dash lines; and FIG. 2 is a horizontal section similar to FIG. 1 but with the actuating lever shown in the neutral position.

With reference now to FIG. 1, the pivotally mounted actuating lever is indicated at 2. The right end of the lever 2, as viewed in the drawing, located outside of gas-filled chamber 3 is connected to one end of an operating rod 1 by means of a forked pivotal connection. The other end of the operating rod 1 is connected to a not-illustrated driving mechanism of any suitable type located without the switch housing for shifting the switch point actuating lever 2 between the two mentioned limit positions. The left end of lever 2 located within switch chamber 3 is connected pivotally to one end of another rod 4 and the opposite end of this rod serves to actuate the switching point contact mechanism within the switch. These details have not been included since they are well known and not essential to an understanding of the present invention.

Lever 2 is pivotally mounted intermediate its ends by means of a bearing which can be designed most simply in the form of a pin 5 which projects beyond both sides of the lever. The bearing supporting pin 5 is formed by two flanged plate halves 6a, 6b which lie at opposite sides of the lever and which are secured to housing 7 by any suitable means such as bolting. The two bearing parts 6a, 6b are also provided with collarshaped projections 6c by means of which and by way of a clamping ring 12, a flanged end of gasket 8 is securely tightened in the switch housing 7 at the right side. At its other end, gasket 8 is securely tightened by means of a sleeve 9 within the diskshaped part 2a, the latter being affixed in a gas-tight manner to lever 2, for example, by welding. In this manner, the interior of the sleeve is sealed off from the gas-filled chamber 3 of the switch housing 7. Gasket 8 rests upon the sleeve 9 which is bolted to lever 2 by means of arms 10a, 10b. The left portion of sleeve 9 has a cylindrical configuration and includes a spherically shaped zone 9a within the vicinity of the pivotal axis, i.e. at bearing pin 5, at the place of the passage of the lever 2 and its attached sleeve 9 where the spherical part 9a engages a complementarily configured surface 7a which defines in part the pass-through opening through switch housing 7. Gasket 8 is designed in the form of a thin, extremely elastic elastomer-lid which carries on its inside a low-friction sliding layer 11 having a long-wear characteristic. The gasket is installed under such pre-stress that it will absorb, by its elasticity, the longitudinal differences formed during pivotal motion of the actuating lever 2, and that it will be pressed smoothly against sleeve 9 in any position by the pressure of the gas within the housing 7. It is also advantageous to design and to arrange the lever 2 in such manner that its pivot axis i.e., pivot pin 5 is located outside in the free atmosphere, the right end of lever 2 being extended beyond the housing 7 for connection to the operating rod 1, as illustrated.

I claim:

1. In a compressed gas electrical switch structure, the combination comprising a housing and which includes therein a chamber filled with a pressurized gas, said housing being provided with a pass-through opening into said gas-pressurized chamber from the free atmosphere, a lever, said lever being pivotally mounted on intermediate its ends on said housing and extending through said pass-through opening, one end of said lever extending beyond said housing into the free atmosphere and which is connected to an operating rod and the other end extending into said gas-pressurized chamber and which is connected to a switch contact operating member, a sleeve surrounding said pivotally mounted lever and secured thereto, said sleeve including a cylindrical part which is closed at one end thereof within said gas-pressurized chamber and a spherically shaped part at the other end in contact with a complementarily configured part of said housing at said pass-through opening, a gasket of elastic material surrounding and in contact with said sleeve in said gas pressurized chamber, one end of said gasket being secured to the closed end of said sleeve so as to seal off that end of said sleeve from said gas-pressurized chamber and the other end of said gasket which overlies the spherical part of said sleeve being secured to said housing at said pass-through opening to seal off said gas-pressurized chamber from the outside.

2. Electrical switch as defined in claim 1 wherein the interior surface of said gasket facing the surface of said sleeve is provided with a sliding layer having a low friction characteristic.

* * * * *